United States Patent [19]

Perrotti et al.

[11] Patent Number: 5,110,539
[45] Date of Patent: May 5, 1992

[54] SPACER GRID ASSEMBLY FIXTURE

[75] Inventors: Patrick A. Perrotti, Newington; Zeses E. Karoutas, Simsbury, both of Conn.

[73] Assignee: Combustion Engineering, Inc., Windsor, Conn.

[21] Appl. No.: 624,338

[22] Filed: Dec. 7, 1990

[51] Int. Cl.⁵ .............................................. G21C 3/34
[52] U.S. Cl. ........................... 376/439; 376/438; 376/462; 376/442; 376/443
[58] Field of Search .............. 376/438, 462, 442, 443, 376/439

[56] References Cited

U.S. PATENT DOCUMENTS

| | | | |
|---|---|---|---|
| 4,539,738 | 9/1985 | Antol et al. | 29/467 |
| 4,714,585 | 12/1987 | Kast | 376/442 |
| 4,726,926 | 2/1988 | Patterson | 376/439 |
| 4,728,489 | 3/1988 | Hatfield | 376/439 |
| 4,793,962 | 12/1988 | Tsitsichvili | 376/261 |

Primary Examiner—Donald P. Walsh
Assistant Examiner—Meena Chelliah
Attorney, Agent, or Firm—Chilton, Alix & Van Kirk

[57] ABSTRACT

A method and apparatus for assembling an egg-crate type grid (10) by orthogonally interengaging slots (30,32) cut transversely into one longitudinal edge of each of a plurality of metal strips (12,14). A first plurality of strips (14) is supported on their lower unslotted edges in north-south orientation so that the strips are uniformly spaced apart in parallel in the east-west direction with all the slots (32) oriented upwardly on the upper edge. The slotted upper edges (26) of adjacent north-south strips are then spread farther apart in the east west direction while maintaining the lower edges (28) at said uniform spacing. The lower, slotted edges (24) of a second plurality of east-west oriented strips are interengaged with the north-south strips while the selected portions of the upper edges of the north-south strips are spread. The upper edges of the first plurality of strips are then returned to the unspread orientation.

11 Claims, 6 Drawing Sheets

SPACER GRID ASSEMBLY FIXTURE

BACKGROUND OF THE INVENTION

The present invention relates to nuclear reactor fuel assemblies, and more particularly, to apparatus and method for fabricating nuclear fuel assembly grids.

The engineering and fabrication of nuclear fuel assemblies has become a highly developed art, which takes into consideration the physics associated with the fission process, the structural strength and thermal hydraulic characteristics, and ease of fabrication. Superficially, nuclear fuel assemblies from most commercial vendors appear similar in that they consist of an eggcrate formed by the interengagement of slotted zircaloy strips so as to define a plurality of individual cells having integrally formed fuel rod support structure projecting therein. Subtle design differences can, however, result in significant differences in-reactor performance and cost of fabrication.

Figure 1:
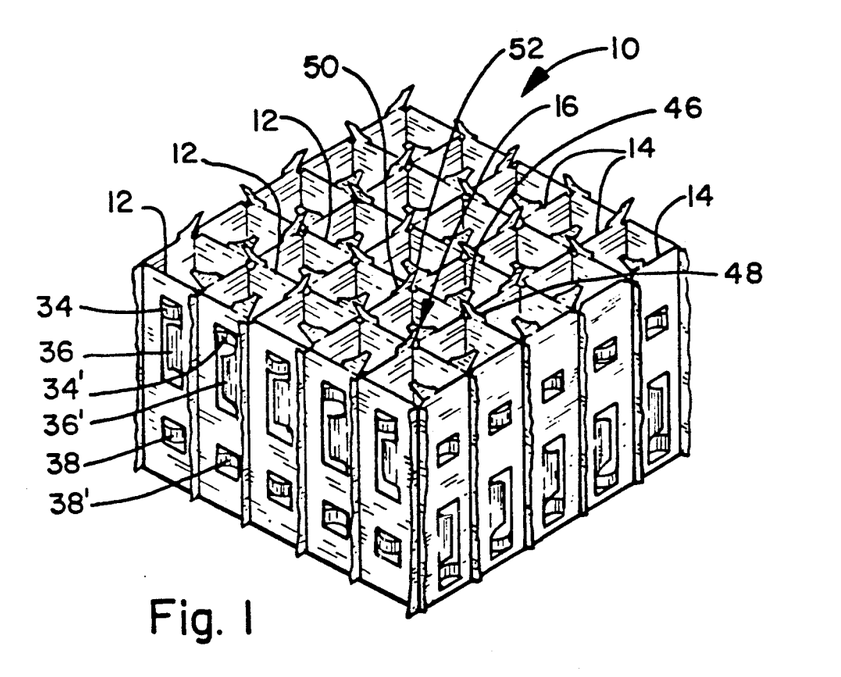
FIG. 1 is a perspective view of a portion of a nuclear fuel assembly grid that has been fabricated in part using the apparatus and method of the present invention.

One such detail is shown in the fuel assembly of U.S. Pat. No. 4,879,090, the disclosure which is hereby incorporated by reference. FIG. 1 of the present application reproduces one of the Figures in the '090 patent, to show vanes projecting inwardly towards the center of each cell. These projections are generally referred to as mixing vanes and are intended to promote the swirling and cross flow of coolant within and between flow chambers, so as to maintain a substantially uniform coolant temperature at any given elevation in the grid during operation of the reactor. For thermal hydraulic performance considerations, these vanes should be relatively large. From the point of view of minimizing labor cost for fabricating the grids, the vanes should be bent relative to the upper edge of each strip, before the strips have been assembled into the eggcrate configuration.

For reasons to be described more fully below, however, the geometric relationship between large vanes and the fuel rod support structure which projects from each strip, and the necessity of forming the eggcrate by lowering one type of strip onto another type of strip so that the respective slots will be interengaged, has posed difficulties arising from the interaction of the vanes with the fuel rod support structure during fabrication. The relatively large, rigid fuel rod support structure interferes, or hangs up on the bent vanes of the neighboring strips as the strips are moved vertically relative to each other during fabrication.

Increasing the projection of mixing vanes in the direction normal to their bend axis increases their blockage area and improves their DNB performance. It also moves the vane tips into the path of the rod supports on the perpendicular strips as the latter slide past during assembly. Increasing the width (the dimension perpendicular to the fuel rod axis) of the rod supports tends to reduce the plastic deformation of the material from which type from which they are formed. This minimizes the potential for cracking or "orange peeling" during the stamping operation but it also increases the width of the path that they sweep out during assembly. The residual stress induced by the formation of the rod supports (especially the arch) in the slotted portion of the strip causes the tabs between slots to bow out of the plane of the strip. When these tabs contain mixing vanes that bow can increase the intrusion of the vane tips into the path of the rod supports and further aggravate interference between them. The vane/rod support interference can greatly complicate the assembly of the individual strips into a spacer grid array but after the strips are fully meshed, it ceases to be a problem.

One conventional approach is either to minimize labor cost but suffer a performance penalty by utilizing small vanes that, even when bent prior to fabrication, will not interfere with the fuel rod support structure during fabrication. The other compromise solution is to maximize in-reactor performance by providing relatively larger vanes, but at the increased labor costs associated with bending the vanes after the eggcrate has been assembled.

SUMMARY OF THE INVENTION

It is thus an object of the present invention to provide apparatus and method for interengaging a plurality of orthogonal grid strips of the type having mixing vanes bent over from the top edge of each strip.

It is a particular object of the invention to provide apparatus and method for facilitating the eggcrate fabrication of fuel assembly grid strips whereby interference between the fuel support structure and the mixing vanes during fabrication is avoided.

The method in accordance with the invention includes the steps of supporting a first plurality of (Type B) strips on edge in a parallel north-south orientation so that the strips are uniformly spaced apart in the east west direction with all the slots oriented upwardly. The upper edges of adjacent north-south strips are spread further apart in the east-west direction while maintaining the lower edges at the original uniform spacing. The lower, slotted edges of a second plurality of (Type A) strips having a parallel east-west orientation are interengaged with the north-south strips while the upper edges of the north-south strips are spread. The upper edges of the north-south strips are then returned to their original, unspread condition.

The apparatus embodiment is a device for interengaging a plurality of metal strips having a substantially uniform nominal height, in orthogonally intersecting, egg-crate fashion during the fabrication of spacer grids for nuclear fuel assemblies, each grid when fabricated having a plurality of cells of uniform vertical height substantially equal to the nominal height and arrayed on a uniform horizontal pitch. The device includes a guide member having a plurality of vertically extending guide slots each defined by juxtaposed, rigid slot walls having a vertical height less than the nominal height. Each slot is in alignment in a first horizontal direction with a plurality of other slots to define a guide channel. The guide member has a plurality of the guide channels extending in parallel in the first direction and separated laterally from each other at regular intervals in a second horizontal direction perpendicular to the first direction. The interval is substantially equal to the cell pitch. Each aligned slot extends in the first direction a distance no greater than the interval distance, whereby the channels can receive and support a respective plurality of strips standing on a lower edge and extending in parallel in the first direction, with the upper edge of each strip extending vertically above the associated guide slot walls. A spreader member is insertable vertically between the upper edges of two adjacent strips as supported in a respective two channels. The spreader member has bearing surfaces that are opposed in the second direction a distance greater than the interval distance, such that the inserted bearing surfaces will spread the upper edges apart along the second direction.

The method and device provide two functions prior to interengagement of the Type A and Type B strips. They align the intersecting strips to speed up the assembly process, and temporarily bend back the slotted edge portion of the Type B strips. The bending is done so as to eliminate the interference that often occurs between the vanes of the Type B strips and the rod supports of the Type A strips during interengagement of the strips.

The required bending, or deformation, is insufficient to yield the material, so the vanes spring back when the grid is complete and the spreader bars are removed. The guide rails serve to align the Type B strips and to anchor them against the forces due to the spreader bars. Because of the close fit within the slots, it would be difficult to install the Type A strips if this were not done. Because of the precision required, the guide rails are designed to bear on the lower body portion of the strip, rather than on the rod support features.

The use of this spacer grid assembly fixture allows the mixing vanes to be sized for function rather than assembly. It also relaxes the width restrictions on the rod supports, thereby reducing the possibility of cracking during their formation. Finally, its use relaxes flatness requirements on the as-formed strips, thus lessening the possibility of rejects.

BRIEF DESCRIPTION OF THE DRAWINGS

These and other objects and advantages of the invention will be described below with reference to the accompanying drawings, in which.

DESCRIPTION OF THE PREFERRED EMBODIMENT

FIG. 1 is a perspective view of a portion of a fuel assembly grid 10 during a stage of fuel assembly fabrication prior to the insertion of fuel rods therein (not shown). The grid 10 comprises a plurality of substantially identical grid strips 12, arranged in parallel a substantial uniform distance apart, and an equal plurality of grid strips such as 14, having equal spacing therebetween and interengaged with the strips 12 in eggcrate fashion. The interengaged strips define a plurality of substantially uniformly sized cells such as 16.

Figures 2A, 2B:
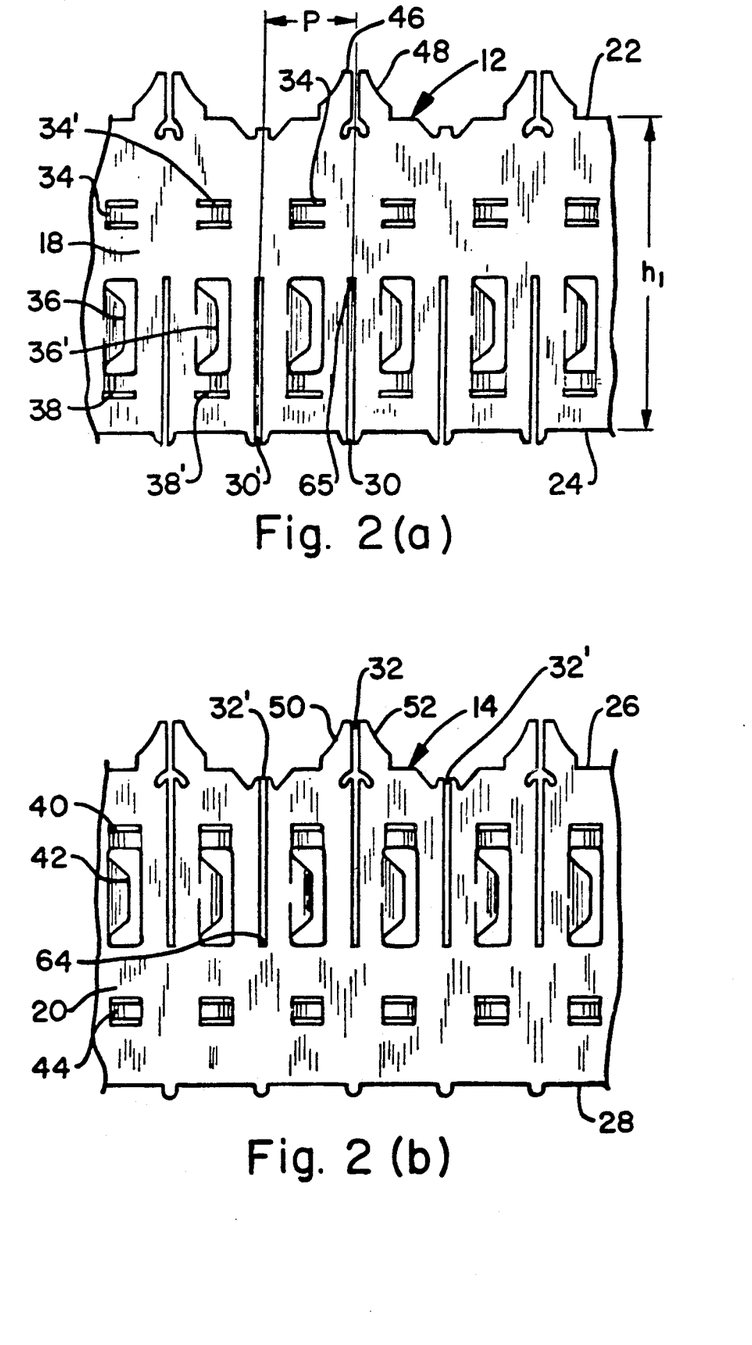
FIGS. 2(a) and 2(b) are elevation views of the Type A and Type B grid strips which constitute the eggcrate structure shown in FIG. 1.

FIGS. 2(a) and 2(b) are enlarged views of the A Type of grid strip 12, and the B Type of grid strip 14, respectively. Each strip 12,14 has substantially the same structural components, but they are arranged with a different geometry. The strips have substantially flat body portions 18,20, and upper and lower edges 22,24 and 26,28, which define a substantially uniform strip height $h_1$. The Type A grid 12 has a plurality of vertically extending slots 30 which extend from the lower edge 24 to an elevation at or substantially near the mid plane of the strip. The B Type strips 14 have slots 32 which extend vertically from the upper edge 26 to or substantially near the strip mid plane. In forming the eggcrate shown in FIG. 1, the strips 14 of FIG. 2(b) are rotated 90° so as to project into and outer of the plane of the drawing, and the A Type strips 12 are then lowered thereon such that slots 30 register with slots 32 and the stop edges 65 on strips 12 touches, or is substantially at the elevation of, the stop edges 64 on slots 32.

The body of each A strip 12 includes a plurality of upper arches 34, spring members 36 and lower arches 38, each set 34,36 and 38 being substantially vertically aligned and each set being laterally spaced apart a uniform distance P corresponding to the pitch of each cell 16 in FIG. 1. In the Type A strip shown in FIG. 2(a), the spring element 36 is at or below the strip midline, laterally adjacent to the slots 30. Grid strip Type B 14, has corresponding sets of fuel support elements 40,42 and 44 which sets are likewise on the same uniform pitch P. The spring elements 42 and the slots 32 are at or above the strip midline.

As can be seen in FIGS. 1 and 2, the integrally formed arches 34 and 38 project toward the observer when spring element 36 projects away from the observer. In the adjacent set, upper arch 34', and the corresponding lower arch 38' project away from the observer, whereas the spring element 36' projects towards the observer. The projection of the arches in the given set in the same direction, and the alternation of the projections laterally along the strip, are characteristics of the A Type strip 12 and B Type strip 14 illustrated herein, but this feature is not necessary for practicing the present invention.

At intervals two times the pitch P, both the A Type grid 12 and B Type grid 14 have vane structure 46,48 and 50,52 projecting from the upper edge 22,26, respectively. The vane structure as shown in FIGS. 2(a) and 2(b) is substantially in the same plane as the strip bodies 18,20, and the vane structure is centered along the strip intersection lines established by slots 30 and 32. The slots 30',32, are not in vertical alignment with corresponding mixing vanes. It should be appreciated that, at some point during fabrication of the grid shown in FIG. 1, the vanes 46,48,50, and 52 must be bent over in a predetermined manner, to project into the cells for accomplishing the desired flow mixing. Considerable savings are achieved if the vanes can be bent over while the strips are in the form shown in FIGS. 2(a) and 2(b), rather than after the strips have been configured in an eggcrate.

Figure 3:
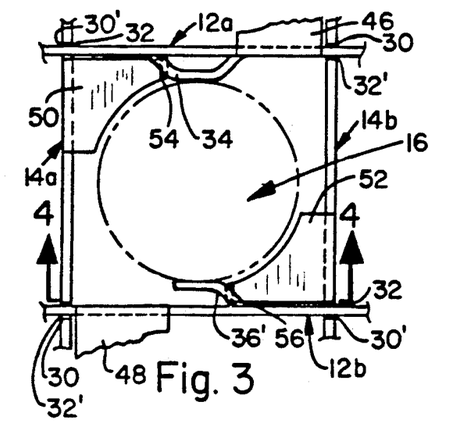
FIG. 3 is a schematic plan view of one cell in the grid of a nuclear fuel assembly showing the interference of the vanes with the adjacent fuel rod support structure.
Figure 4:
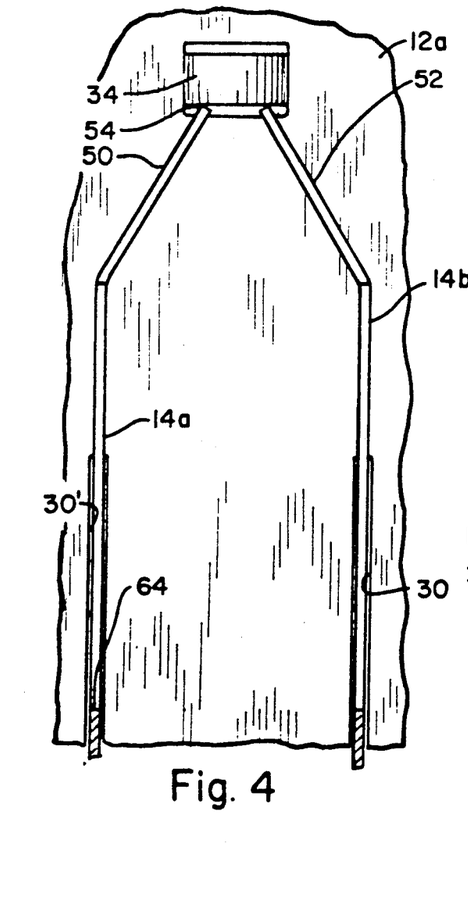
FIG. 4 is a schematic elevation view taken along line 4—4 of FIG. 3 showing the interfering relationship.

The problem arising from the performance objective of providing strong fuel rod support structure and large vanes, is illustrated in FIGS. 3 and 4. FIG. 3 is a plan view of cell 16 of FIG. 1, considerably enlarged, with the circumference of the fuel rod indicated by a broken line. The top corner of cell 16 in the perspective view of FIG. 1, is equivalent to the upper left corner of the cell 16 shown in FIG. 3. Cell 16 is defined by four walls of substantially equal height, established by opposed strips 12a,12b and 14a,14b. The mixing vanes 46,48,50 and 52 are shown in the bent orientation (vanes which do not originate on a wall of cell 16 are not shown for clarity). The cell wall defined by strip 12a has an upper arch 34 which projects into the cell, a spring 36 which projects away from cell 16 and another arch 38 which projects into the cell. Arch 38 is not visible in FIG. 3 because it is directly under arch 34. It should be appreciated that, as observed in the plan view of FIG. 3, a portion of vane 50 vertically overlies a portion of arch 34, thereby establishing an interference 54. Similarly, a portion of vane 52 overlies a portion of spring 36' projecting into the cell 16 from strip 12b, so as to establish an interference 56. It can thus be readily understood that in the usual fabrication technique whereby the Type B strips 14a,14b are oriented in a parallel north-south orientation so that the strips are uniformly spaced apart in east-west direction with all the slits 32,32' oriented upwardly, and then the transversely oriented Type A strips 12a,12b are lowered thereon so that the vertically oriented slots 30,30' interengage with the slots 32,32', the lower arches 38 and the upper arches 34 will interfere with vanes 50 and vane 52 will interfere with spring 36'. FIG. 4 shows in elevation, the interference 54 between arch 34 and vane 50. Spring 36' shown in FIG. 3 is not visible in the view of FIG. 4, but it should be appreciated that because spring 36' has the same profile as arch 34, it would similarly interfere with vane 52.

Figure 5:
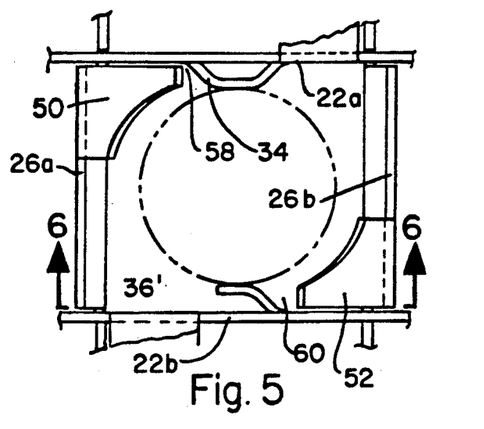
FIG. 5 is a schematic plan view of the cell shown in FIG. 3, illustrating the critical step in accordance with the present invention, whereby the upper portions of the B Type strips are spread apart to permit formation of the eggcrate without interference between the vanes and the fuel rod support structure.
Figure 6:
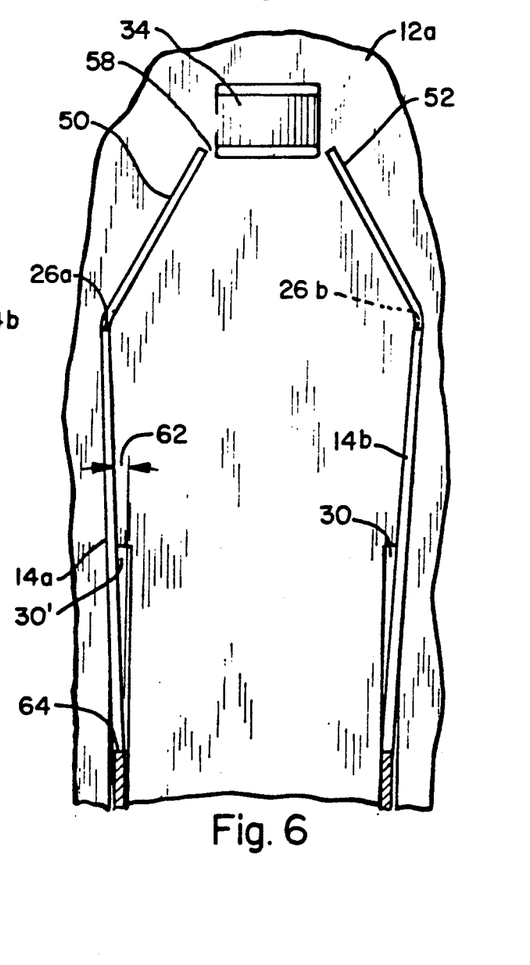
FIG. 6 is an elevation view taken long line 6—6 of FIG. 5, showing the clearance between the vane and the fuel rod support structure.

In accordance with the present invention as shown in FIGS. 5 and 6, the interference problem illustrated in FIGS. 3 and 4 is overcome during fabrication by the step of spreading the upper edges of adjacent Type B strips 14a,14b, farther apart in the east-west direction while maintaining the opposite edges of the Type A strips 12a,12b, at the pitch spacing P. The lower, slotted edges of the Type A strips 12a,12b are interengaged with the Type B strips while the upper edges of the Type B strips are spread. The spreading is maintained long enough for the upper arches 34 to vertically pass the vanes 50 after which the spreading action is released so that the edges return to their normal vertical orientation. As shown in FIGS. 2, 3, 5 and 6, the portion of the strip 14a between slots 32' and 32, and above the elevation of slot edge 64, is in effect cantilevered from the body portion 20 and thus can be deflected from the vertical at an angle 62 such that the vane 50 is no longer in the vertical path of arch 34, but rather has a clearance 58 therebetween. After arch 34 passes vertically below the vane 50, i.e., when the strips 12,14, are in the egg-crate relationship shown in FIG. 1, the spread apart cantilevered portions of the grid strips 14a,14b can be released to return to the vertical and the vanes 50,52 will again vertically overly the arches 34 and springs 36, as shown in FIG. 3. This is the desired geometric relationship for operation in the reactor, i.e., as shown in FIG. 1.

FIGS. 7–11 illustrate the preferred apparatus for performing the spreading function described with respect to FIGS. 5 and 6. A fixture 66 includes a base 68 from which a plurality of guide rails 70,72,74 and 76 project vertically upward in parallel relationship. These guide rails support the B Type strips 14a,14b while a spreader member 78 is inserted therebetween to urge the cantilevered portions of the strips 14a,14b outwardly while the Type A strips 12a,12b are inserted into engagement with the strips 14a,14b.

Figure 7:
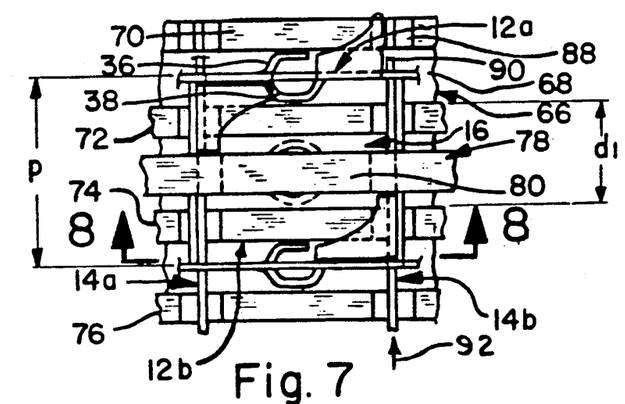
FIG. 7 is a plan view of a portion of the fixture in accordance with the present invention, for spreading the B Type grid strips into the configurations shown in FIG. 5 and 6.

The spreader member 78 preferably includes a top bar 80 which is urged downwardly until it rests against the upper edges 26a and 26b of the B Type strips 14a,14b. Projecting downwardly from the spreader bar 78, is a spreader plate 82 having a width W at the top bar 80 which is greater than the cell pitch P and sufficient to provide the clearance 58 shown in FIG. 6. The spreader plate preferably has a leading edge 86 and an outwardly tapered bearing surface 84 which provides a smoothly applied outward force against the upper edges 26a,26b of strips 14a,14b as the spreader member is urged downwardly.

Figure 8:
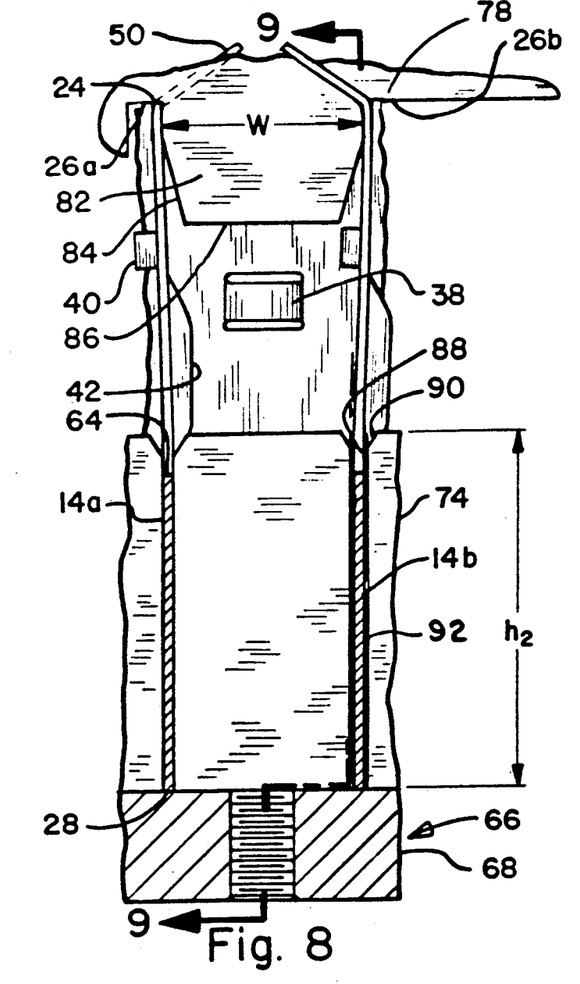
FIG. 8 is an elevation view of the fixture and associated strips, through line 8—8 of FIG. 7.

Each guide rail such as 74 shown in FIG. 8, extends vertically a distance $h_2$ approximately equal to one half the nominal height of the strips 14, and in particular, from the bottom edge 28 to approximately the slot limit 64. Each guide member has a plurality of vertically extending guide slots 88 defined by juxtaposed, rigid slot walls which in any event have a height less than the nominal height of the strip. Each slot 88 is in alignment in a first horizontal direction, i.e., north-south, with a plurality of other slots 88 to define a guide channel 92 to receive the full length of the lower edge 28 of each B Type strip. The guide members define a plurality of guide channels extending parallel in a first, north-south direction and separated laterally from each other at regular intervals in a second horizontal direction perpendicular to the first direction, i.e., in the east-west direction. The east-west interval is substantially equal to the cell pitch P, and each aligned slot extends in the first, i.e., north-south direction, a distance no greater than the cell pitch. Thus, the channels 92 receive and support a respective plurality of B Type strips 14 standing on their lower edges 28 and extending in parallel in the first direction with the upper edge 26 of each strip extending vertically above the associated guide rails 74. The guide slots 88 preferably have flared or V-shaped upper ends 90, to accommodate the spreading apart of the material above the rails and to guide strips into the guide channels.

Figure 9:
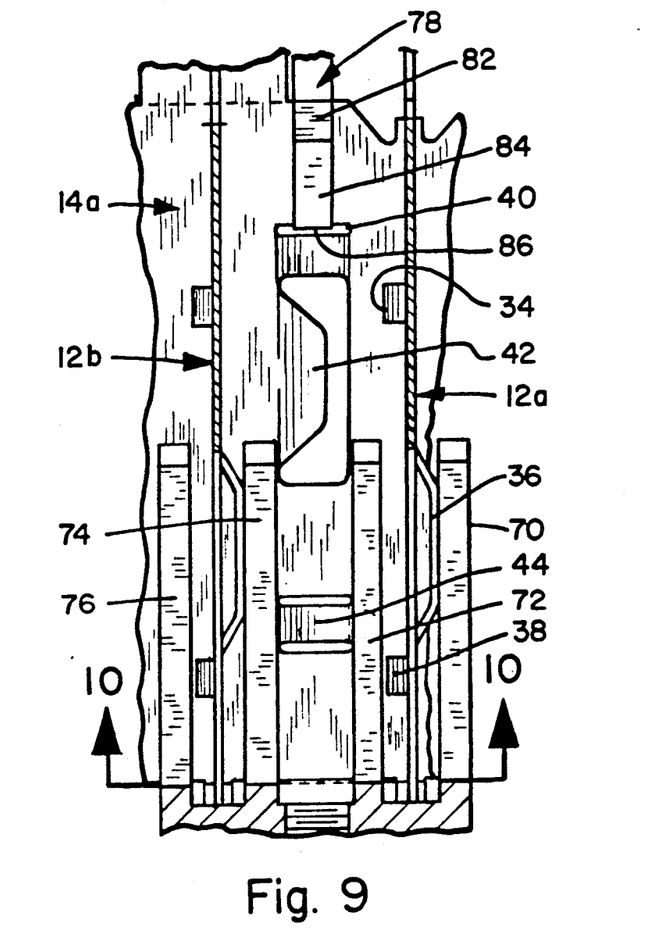
FIG. 9 is an elevation view along line 9—9 of FIG. 8.
Figure 10:
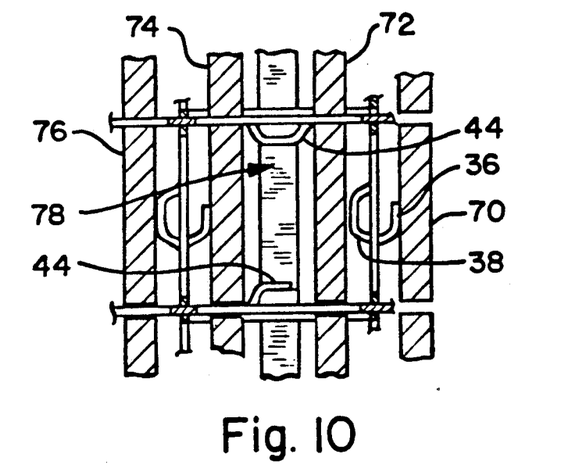
FIG. 10 is a bottom view taken along line 10—10 of FIG. 9.

As is evident in FIGS. 7, 9 and 10, the guide rails are preferably spaced apart in the first direction $d_1$, by a distance equal to approximately one-half the cell pitch P, such that the region between inner guide rails 72,74 is wide enough to accommodate the lateral length of the springs 42 and arches 40 on the B strips, whereas the spaces between spacer rails 70 and 72, and 74 and 76, are sized to closely accommodate the combined projections of the spring elements such as 36 and arch members such as 38 which constitute the fuel rod support structure of the A strips.

Figure 11:
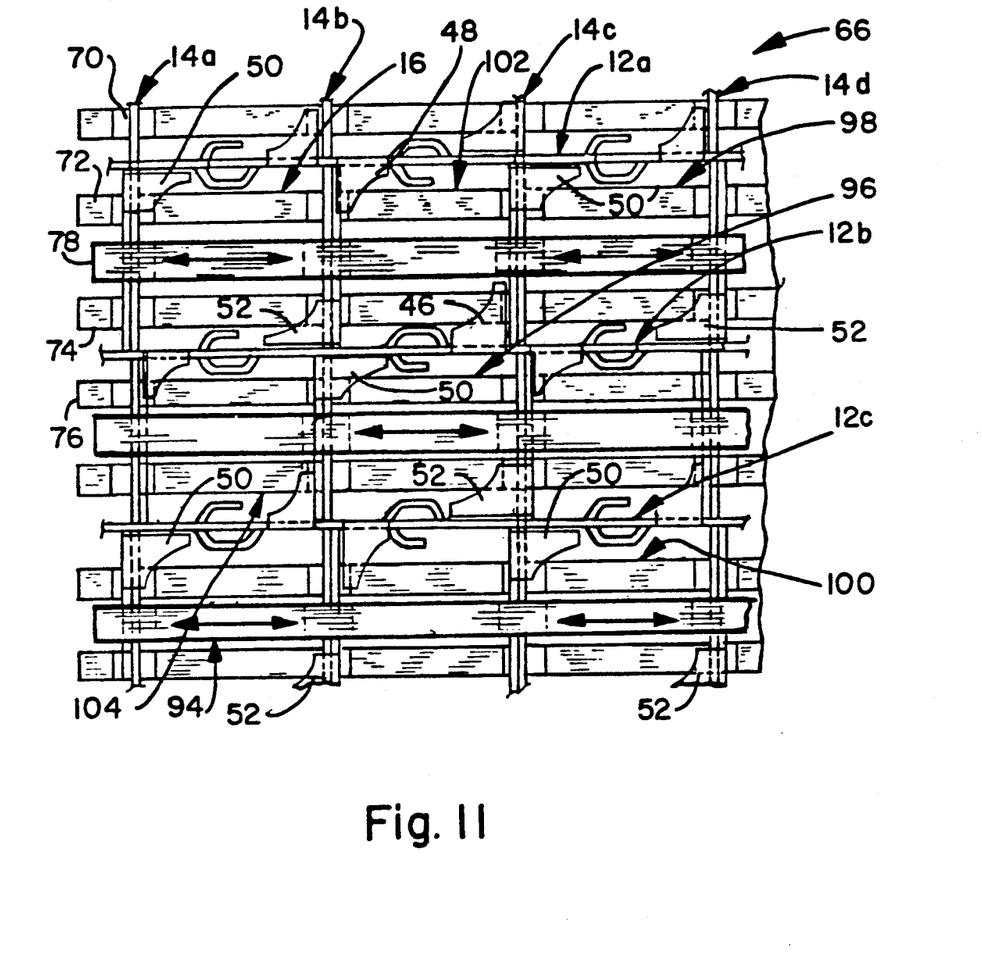
FIG. 11 is a plan view of a larger portion of the fixture shown in FIG. 7.

FIG. 11 shows a larger portion of the fixture 66 containing the cell 16 shown in FIG. 7 including neighboring cells and the associated vanes bent into the cells. Strips 12a,b,c are oriented in east-west parallel relation and spaced apart on a uniform pitch P, and strips 14a,b,c,d are oriented in parallel north-south relation also spaced apart on pitch P. It should be appreciated that although Type A strips 12a,b,c are identical, their relationship is such that the vane structure 46,48 is offset one pitch in the east-west direction, between adjacent Type A strips. Similarly, the north-south strips Type B strips 14a,b,c,d are offset by one pitch, with the result that alternating strips of the A and B Types produce an alternating pattern of cells. More particularly, as viewed in plan, cells 16, 94, 96, 98, and 100 are identical in that the vanes 50, 52 project into the cells from the associated B strips 14. The other types of cells, such as 102 and 104, have the vane structure 46,48 projecting therein from the A Type strips.

One can readily appreciate that the type of interference shown at 54 and 56 in FIG. 3, would occur only in the cells such as 16,96 where the vanes 50,52 are formed by the B Type strips such that interference occurs when the fuel support structure on the A Type strips must past vertically downward in the same cell. In the other cells such as 102,104, the vanes 46,48 are carried at the upper edge 22 of the A Type strips 12 (see FIG. 2a) and although they are bent inwardly towards the channel, they remain vertically above all the fuel rod support structure on both the A and B Type fuel strips so that no interference occurs.

Accordingly, with the present invention, only the cells 16,94,96,98, and 100 require the spreading apart in the east-west direction of the upper edge of the B Type strips. This is shown by the east-west oriented arrows drawn on the spreader member 78 at each of those cells which are diagonally related to each other. The upper edges of the B strips in the other cells such as 102,104, are therefore squeezed together as a result of the spreading action in the cells such as 16,94. This does not present a problem, however, because as mentioned above, the vanes 48,46 in these cells cannot interfere with fuel support structure regardless of the degree of vertical overlap.

Thus, it is desirable that the spreader plates 82 carried by the top bar 80, effectuate a spreading action only in the spread cells such as 16,96. This is accomplished by providing plates only where they are needed. The remainder of the bar would be flat-bottomed.

In a production mode, the fixture 66 provides channels 92 for each of the B Type strips 14 to be supported on base 68 with sufficient spacing in the east-west direction to permit the interengagement of the similar plurality of A Type strips 12. Preferably, before the A Type strips 12 are interengaged to any extent, the spreader members 78 are inserted so as to traverse across every B Type strip 14, at the pitch intervals P, to align horizontally midway between adjacent slots 32,32', i.e., in vertical alignment with spring members 42. The spreader plates 82 are preferably as thick as possible in the north-south direction but less than the north-south distance between the vanes 50,52 in the same cell 16. In other words, the thickness of spreader member 78 is less than $(P-2 \times V)$ where V is the maximum dimension of each vane taken in the direction parallel to its strip.

The spreader members 78 can be pushed downward simultaneously to effectuate the spreading action on all the spread cells simultaneously, or only one spreader member 78 can be used sequentially to construct rows of cells one at a time along the north-south direction of FIG. 11. In any event, the A Type strips 12 can readily be downwardly interengaged with the grooves 32,32' of the B Type strips 14 even when the upper portions of the B Type strips are spread apart, because the slots 32,32' only move in the east-west direction as a result of the spreading action. Thus, the slots remain in the same plane defined by the body portion of the A Type strips 12. In this manner, as shown by following the upper edge of strip 14b from top to bottom in the view of FIG. 11, adjacent portions of the upper edge of the B type strips 14, each portion having a length of about P minus the slot width, are alternately bent to the east and west.

It should be appreciated that the apparatus described above is the embodiment currently preferred by the inventors, but that other implementations of the inventive concept will fall within the scope of the claims.

What is claimed is:

1. A method for assembling an egg-crate type grid by orthogonally interengaging slots cut transversely into one longitudinal edge of each of a plurality of metal strips, comprising:
   supporting a first plurality of strips on their lower unslotted edges in north-south orientation so that the strips are uniformly spaced apart in parallel in the east-west direction with all the slots oriented upwardly on the upper edge;
   pre-positioning selected portions of the slotted upper edges of adjacent north-south strips farther apart in the east west direction while maintaining the lower edges at said uniform spacing;
   interengaging the lower, slotted edges of a second plurality of east-west oriented strips with the north-south strips while the selected portions of the upper edges of the north-south strips are spread; and
   returning the upper edges of the first plurality of strips to the unspread orientation.

2. The method of claim 1, wherein the step of spreading the slotted upper edges is performed by lowering a spreader bar extending in the east-west direction and having bearing surfaces which are separated in the east-west direction by a distance greater than said uniform spacing, downward into contact with the first plurality of strips.

3. The method of claim 2, wherein the grid is a nuclear fuel grid which when formed defines a rectangular array of fuel rod cell locations and wherein the step of spreading is performed only on the portions of the upper edges of the first plurality of strips, that define cells that are adjacent to each other only diagonally in the array.

4. A method for interengaging a plurality of metal strips to form an egg-crate type spacer grid for a nuclear fuel assembly, each strip having upper and lower longitudinally extending horizontal edges defining a nominal strip height dimension therebetween, a vertically oriented edge at each longitudinal end of the strip, a substantially flat body portion extending within the upper, lower, and end edges, a plurality of slots extending from a longitudinal edge toward approximately the longitudinal midline of the body portion and spaced apart at regular intervals in the longitudinal direction, and fuel rod support structure projecting horizontally from the body portion between said slits at the same said intervals, wherein the method comprises:
   selecting a plurality of a first type (B) of said grid strips, having said slots spaced apart along the strip upper edge;
   orienting the selected first strips in a first direction in side by side, parallel relation with the body portions of adjacent strips facing each other in a second direction perpendicular to the first direction and with the plurality of slots of each strip respectively aligned with the corresponding plurality of slots on the other first strips, along the second direction;
   laterally supporting the first type of strips below the midline and between the slots;

applying a spreading force between adjacent strips of the first type to spread the upper edges of the first strips apart along said second direction;

selecting a plurality of a second type (A) of said grid strips, having said slots spaced apart along the strip lower edge;

orienting and placing the lower longitudinal edge of the selected second strips on the upper longitudinal edges of the first strips so that the slots of each second strip are aligned in the second direction with the said aligned slots on the first type of strips;

sliding the slots of each of the second type of strip downward over the spread-apart upper longitudinal edges of the first type of strip until the first and second types of strips are interengaged so that the lower edge of each of the second strips is in the same plane as the lower edge of the first type of strips; and releasing the spreading force.

5. The method of claim 4, wherein the strips of egg-crate type spacer grid define a regular array of fuel rod cells and wherein the step of applying a spreader force is performed only on the portions of the strips that define diagonally adjacent cells in the array.

6. A device for use in interengaging a plurality of metal strips having a substantially uniform nominal height in orthogonally intersecting, egg-crate fashion during the fabrication of spacer grids for nuclear fuel assemblies, each grid when fabricated having a plurality of cells of uniform vertical height substantially equal to said nominal height and arrayed on a uniform horizontal pitch, wherein the device comprises:

a guide member having a plurality of vertically extending guide slots each defined by juxtaposed, rigid slot walls having a vertical height less than said nominal height, each slot being in alignment in a first horizontal direction with a plurality of other slots to define a guide channel, the guide member having a plurality of guide channels extending in parallel in said first direction and separated laterally from each other at regular intervals in a second horizontal direction perpendicular to the first direction, said interval being substantially equal to said cell pitch, and each aligned slot extending in the first direction a distance no greater than said interval distance, whereby the channels can receive and support a respective plurality of strips standing on a lower edge and extending in parallel in the first direction, with the upper edge of each strip extending vertically above the associated guide slot walls; and a spreader member insertable vertically between the upper edges of two adjacent strips supported in a respective two channels, the spreader member having bearing surfaces that are opposed in said second direction a distance greater than said interval distance, such that the inserted bearing surfaces will spread at least a portion of said upper edges apart along said second direction.

7. The device of claim 6, wherein said guide member include a plurality of guide rails extending in parallel spaced relationship in the second direction and spaced apart in the first direction a distance less than said cell pitch, said rails defining said guide slots and said channels in said first direction.

8. The device of claim 6, wherein the vertical height of said slot walls is approximately equal to one-half the nominal height of the strips.

9. The device of claim 6, wherein the spreader member has a length equal to at least three of said pitch intervals and the spreader member includes at least two spreader plates extending perpendicularly from the bar, each spaced apart along the bar by twice said pitch interval, wherein the plate has said bearing surfaces.

10. The device of claim 6, wherein each strip has a plurality flow vanes projecting from the strip upper edge, and wherein the bearing surfaces have a thickness in said first direction that is no greater than the quantity $(P - 2 \times V)$ where the quantity V is the maximum dimension of the vane taken in the direction parallel to the strip.

11. The device of claim 7, wherein each strip has fuel support structure projecting perpendicularly to the body of the strip, and wherein the separation distance between the guide rails is at least equal to the total projection distance of the fuel support structure from one side of the strip to the other.

* * * * *